United States Patent
Raman et al.

[11] Patent Number: 5,935,646
[45] Date of Patent: *Aug. 10, 1999

[54] MOLECULAR SIEVING SILICA MEMBRANE FABRICATION PROCESS

[75] Inventors: Narayan K. Raman, Monroeville, Pa.; Charles Jeffrey Brinker, Albuquerque, N.Mex.

[73] Assignees: Gas Research Institute, Chicago, Ill.; Sandia National Laboratories, Albuquerque, N.Mex.

[*] Notice: This patent is subject to a terminal disclaimer.

[21] Appl. No.: 09/013,346

[22] Filed: Jan. 26, 1998

Related U.S. Application Data

[63] Continuation-in-part of application No. 08/702,745, Aug. 23, 1996, Pat. No. 5,770,275.

[51] Int. Cl.⁶ ............................................... B05D 5/00
[52] U.S. Cl. ..................... 427/244; 427/216; 427/271; 427/273; 427/340; 427/343; 427/345; 427/352; 427/353; 427/385.5; 427/535; 427/569; 427/576
[58] Field of Search ...................... 427/535, 345, 427/576, 216, 569, 271, 244, 273, 340, 343, 352, 353, 385.5

[56] References Cited

U.S. PATENT DOCUMENTS

| | | |
|---|---|---|
| 3,963,504 | 6/1976 | Lundsager . |
| 4,221,748 | 9/1980 | Pasco et al. . |
| 4,562,021 | 12/1985 | Alary et al. . |
| 4,588,540 | 5/1986 | Kiefer et al. . |
| 4,973,435 | 11/1990 | Jain et al. . |
| 5,087,277 | 2/1992 | Gonzalez et al. . |
| 5,096,745 | 3/1992 | Anderson et al. . |
| 5,151,110 | 9/1992 | Bein et al. . |
| 5,169,576 | 12/1992 | Anderson et al. . |
| 5,224,972 | 7/1993 | Frye et al. . |
| 5,770,275 | 6/1998 | Raman et al. ............... 427/535 |

OTHER PUBLICATIONS

Andreas Mandelis & Constantinos Christofides, *Chemical Analysis*, "Physics, Chemistry and Technology of Solid State Gas Sensor Devices", John Wiley & Sons, Inc., vol. 125, pp. 1–18. (No Date Avail.).

Enrico Traversa, *Journal of American Ceramics Society.*, "Design of Ceramic Materials for Chemical Sensors with Novel Properties", 78, (10) 2625–32 (1995). (No Month Avail.).

Robeson, L.M., *Journal of Membrane Science*, 62 (1991) pp. 165–185. (No Month Avail.).

Brinker and Scherer, *Sol–Gel Science*, Academic Press, San Diego, 1990, Chapter 1, pp. 6 and 7. (No Month Avail.).

*Primary Examiner*—Bernard Pianalto
*Attorney, Agent, or Firm*—Pauley Petersen Kinne & Fejer

[57] ABSTRACT

A process for producing a molecular sieve silica membrane comprising depositing a hybrid organic-inorganic polymer comprising at least one organic constituent and at least one inorganic constituent on a porous substrate material and removing at least a portion of the at least one organic constituent of the hybrid organic-inorganic polymer, forming a porous film.

12 Claims, 10 Drawing Sheets

Region A : γ-Al$_2$O$_3$ Support Layer

Region B : Silica Membrane Layer

MOLECULAR SIEVING SILICA MEMBRANE FABRICATION PROCESS

CROSS-REFERENCE TO RELATED APPLICATION

This application is a continuation-in-part application of a U.S. patent application filed Aug. 23, 1996 and having Ser. No. 08/702,745, U.S. Pat. No. 5,770,275.

This invention was made in the course of work authorized by U.S. Department of Energy Contract No. DE-ACD4-94AL85000. The Government has certain rights in this invention.

BACKGROUND OF THE INVENTION

1. Field of the Invention

This invention relates to a process for fabrication of molecular sieving silica membranes suitable for use in gas separation applications.

2. Description of Prior Art

A gas separation membrane can be described as a semipermeable organic or inorganic barrier capable of separating gases by virtue of differences in diffusion coefficients, solubility, or size. At high temperatures, facilitated transport mechanisms, such as selective adsorption or capillary condensation, are generally not operative. As a result, membrane selectivity is mainly achieved by size exclusion. Inorganic membranes, owing to their presumed superior thermal, mechanical, and chemical stability, compared to that of organic polymer membranes, have been proposed as replacements for energy intensive industrial separation processes such as distillation, drying, and evaporation. In addition to consuming less energy than conventional industrial separation processes, membrane systems are compact and modular, enabling easy incorporation into existing industrial processes. In order to be commercially feasible, gas separation membranes should exhibit high selectivity, which is achieved by having small pore sizes and narrow pore size distributions, and high permeance, which is defined as flux/pressure drop, achieved by having a large volume fraction porosity and a very thin selective layer. The selectivity, or separation factor, of the membranes pertaining to this invention is defined as the ratio of the permeance of the faster permeating gas to the permeance of the slower permeating gas. These membranes have potential applications in separations such as dehydrogenation, the separation of nitrogen from methane in ammonia plants, the production of oxygen and nitrogen from air, enhanced oil recovery, the separation of carbon dioxide and nitrogen from methane in natural gas processing and carbon dioxide recovery from land fills. To date, however, the potential applications of these membranes have not been realized due to the difficulty in obtaining very small pore sizes, and more importantly, due to the current procedures used for obtaining very small pore sizes which often result in an unfavorable reduction of the gas flux through the membrane.

Membranes for gas separation can be made using organic or inorganic routes. Organic membranes generally exhibit high separation factors for various gases of industrial interest, but their intrinsic permeability is very low. Gas transport through organic membranes occurs through a solution diffusion mechanism in which the permeation process is controlled by the molecular diffusion of gases in a dense organic polymer matrix. Several studies have shown that due to some intrinsic polymer property, such as free volume, there is an apparent trade-off between permeability and selectivity independent of chosen gas pair or polymer. See, for example, Robeson, L. M., *Journal of Membrane Science*, 62 (1991) pages 165–185. In addition to this trade-off, organic membranes have several other potential disadvantages including limited thermal stability, limited chemical stability, especially to organic solvents, and poor mechanical strength.

In contrast, porous inorganic membranes overcome many of the inherent limitations of organic membranes because there is no intrinsic relationship between permeability and selectivity. Permeability is controlled by volume fraction porosity, whereas selectivity is determined by the pore size and pore size distribution. Size-selective gas separation using porous inorganic membranes is by far the most attractive way to separate gas mixtures of industrial importance from the standpoint of energy consumption and economics. The combination of small pore sizes, narrow pore size distribution, high porosity, with tailored pore topology, pore surface chemistry, and surface adsorption/diffusion characteristics makes these membranes attractive for a wide range of applications including ultrafiltration, microfiltration, or gas separation, such as dehydrogenation, nitrogen/methane separation in ammonia plants, oxygen/nitrogen separation from air, enhanced oil recovery, separation of carbon dioxide and nitrogen from methane in natural gas processing, and carbon dioxide recovery from land fills. The increasing industrial requirements for low cost gases with high purity has provided a strong impetus towards developing inorganic membranes with unique separative properties. Inorganic membranes are prepared from both particulate and polymeric precursors with a wide range of pore sizes and porosities.

The particulate approach to preparing inorganic membranes involves slip-casting and calcination of a charged stabilized colloidal sol. See, for example, U.S. Pat. No. 4,562,021 which teaches a method of manufacturing a medium for microfiltration, for ultrafiltration, or for reverse osmosis in which a sol of particles of an oxide or a hydroxide of a chemical element is formed, a thickening agent is added to the sol, and the resulting sol is slipcast onto a support layer having pores which are larger than the pores desired for the filter medium, the thin layer deposited on the support medium being dried and then heat treated to eliminate the thickening agent and to sinter the particles of the deposited thin layer. See also, U.S. Pat. No. 5,096,745 which teaches a process for preparing particulate or polymeric titania ceramic membranes which includes the steps of preparing a colloidal solution containing a titanium organic salt with a specific ratio between water and titanium concentration in the colloid so as to determine whether the resulting membrane is either particulate or polymeric, adding to the colloidal solution an alkyl alcohol, and sintering the gel created from the colloid into a ceramic so as to prevent cracking of the resulting membrane. See also, U.S. Pat. No. 5,169,576.

Particulate sols consist generally of highly condensed ceramic particles in the 2–200 nanometer size range obtained in $SiO_2$, $Al_2O_3$, and $TiO_2$ systems. In membranes prepared from monosized particulate sols obtained by hydrolysis of metal salts or alkoxides, pore volume depends simply on the particle packing, and pore size decreases linearly with the particle size when aggregation is avoided. An advantage of the particulate approach is that the porosity of the membrane is independent of pore size. However, the particulate approach has several disadvantages. In particular, colloidal stability is essential to avoid aggregation of the concentrating particles which otherwise would result in a bimodal pore size distribution, that is, pores within and between aggregates. In addition, the small particles necessary to obtain small pore sizes have associated with them a relatively thick tightly bound solvent layer that decreases the volume fraction of solids in the deposited film. The removal of this solvent during drying creates tensile stresses within the plane of the film that results in cracking.

The polymeric approach for preparing inorganic membranes involves slip-casting and calcination of a polymeric sol. Polymeric sols consist generally of more or less branched clusters that do not contain a fully condensed ceramic core and are obtained in the $SiO_2$, $Al_2O_3$, $ZrO_2$ and $TiO_2$ systems under conditions where the reaction rate is minimized; for the case of non-silicates, complexation chemistry is often used to reduce the polymer functionality. The inorganic polymer approach for making membranes offers several advantages. First, crack free membrane layers can be prepared where aggregation of polymeric precursors is exploited to control the pore size. Secondly, the size of the polymeric species can be controlled so that the deposited membrane forms a thin layer that spans the support with minimal pore plugging. And, finally, the physical and chemical characteristics of the membrane can be altered, either in the sol stage or in the deposited membrane stage, to alter the surface chemistry, while maintaining control of the pore size.

A potential disadvantage of the polymeric approach is that small pore sizes and narrow pore size distributions are achieved at the expense of pore volume. As a result, the permeability of the membrane may decrease to the point where the membranes are no longer practically viable.

U.S. Pat. No. 4,973,435 teaches a method for producing porous membranes of sinterable refractory metal oxides wherein a powder of the metal oxide is dispersed in an organic polymer in an amount such that, after the polymer has been carbonized in a subsequent step, there is a stoichiometrical excess of the oxide to carbon. The solution is then shaped to form a desired thin membrane and the polymer is then carbonized by heating it in a non-oxidizing atmosphere. The resulting product is heated to a temperature at which the carbon reacts with the oxide to form a volatile sub-oxide and carbon monoxide and the remaining oxide particles sinter together. A method of manufacturing porous sintered inorganic bodies with large open pore volumes in which a sinterable material in the form of finely ground powder is mixed with a leachable substance in the form of a powder, and a mixture of sinterable material and leachable substance is heated to a sintering temperature and maintained there until the sinterable mass is sintered, after which the mass is then cooled and the leachable substance leached from the sintered mass is taught by U.S. Pat. No. 4,588,540. U.S. Pat. No. 4,221,748 teaches a method for making porous, crushable cores having a porous integral outer barrier layer with a density gradient therein. The method includes the process steps of preparing a material composition consisting essentially of an organic binder, a reactant fugitive filler material, and an alumina flour. A portion of the material composition is then worked into a preform of a predetermined shape of the ceramic article to be produced. The preform is then heated to remove the organic binder while retaining substantially all of the reactant fugitive filler material therein. Heating is then continued in a controlled atmosphere to react the alumina and the reactant fugitive filler material to produce at least one or more suboxides of alumina. The one or more suboxides of alumina are vapor transported throughout the fired preform to produce a ceramic article having a predetermined porosity content, grain morphology, and crushability characteristics. A portion of the suboxides of alumina are oxidized to form a porous integral barrier layer of alumina at the surface of the ceramic article, the layer having a density gradient across its thickness. The remainder of the suboxides escape from the core resulting in a net weight loss. U.S. Pat. No. 3,963,504 teaches a porous ceramic monolithic structure prepared by shaping a ceramic filled polyolefinic material containing a plasticizer, shaping, extracting the plasticizer and treating to remove the polyolefin. Finally, U.S. Pat. No. 5,087,277 teaches a high temperature ceramic filter produced from a composition containing refractory cement, aggregate, pore forming additives and sintering agents.

SUMMARY OF THE INVENTION

It is an object of this invention to provide a process for producing molecular sieving silica membranes which overcomes the potential disadvantages of traditional approaches to producing such membranes as discussed hereinabove.

It is an object of this invention to provide a process for producing gas separation membranes having high selectivity achieved by having small pore sizes and narrow pore size distributions, and high permeance, defined as flux/pressure drop, achieved by having a large volume fraction porosity and a very thin selective layer.

It is yet another object of this invention to provide a process for producing molecular sieving silica membranes using fugitive organic ligands as micropore templates. In this approach, organic templates are introduced in a dense inorganic matrix and then removed oxidatively or hydrolytically to create a microporous channel system that exhibits molecular sieving and/or molecular recognition characteristics. Ideally, the organic ligand volume fraction is used to control porosity enhanced flux, independently of selectivity, which depends on the ligand size and shape. In order to successfully implement this approach, several criteria must be satisfied. The organic ligands must be uniformly incorporated in the inorganic matrix without aggregation or phase separation to avoid creating pores larger than the size of the individual ligands; the synthesis and processing conditions should result in a dense embedding matrix so that pores are created only by template removal; and template removal should be achieved without collapse of the matrix, so that the pores created preserve the original size and shape of the template.

These and other objects of this invention are achieved by a process for producing a molecular sieve silica membrane comprising depositing a hybrid organic-inorganic polymer comprising at least one organic constituent and at least one inorganic constituent on a porous substrate material and removing at least a portion of the organic constituent of the hybrid organic-inorganic polymer, forming a porous film. More particularly, the process for producing a molecular sieve silica membrane in accordance with one embodiment of this invention comprises generating a sol comprising a precursor of a hybrid organic-inorganic polymer, storing the sol in a quiescent state under conditions suitable for promoting hydrolysis, condensation, and/or ripening, forming a hybrid organic-inorganic polymer, coating a substrate material with the hybrid organic-inorganic polymer, and removing at least a portion of an organic constituent of the coating, forming a porous film.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
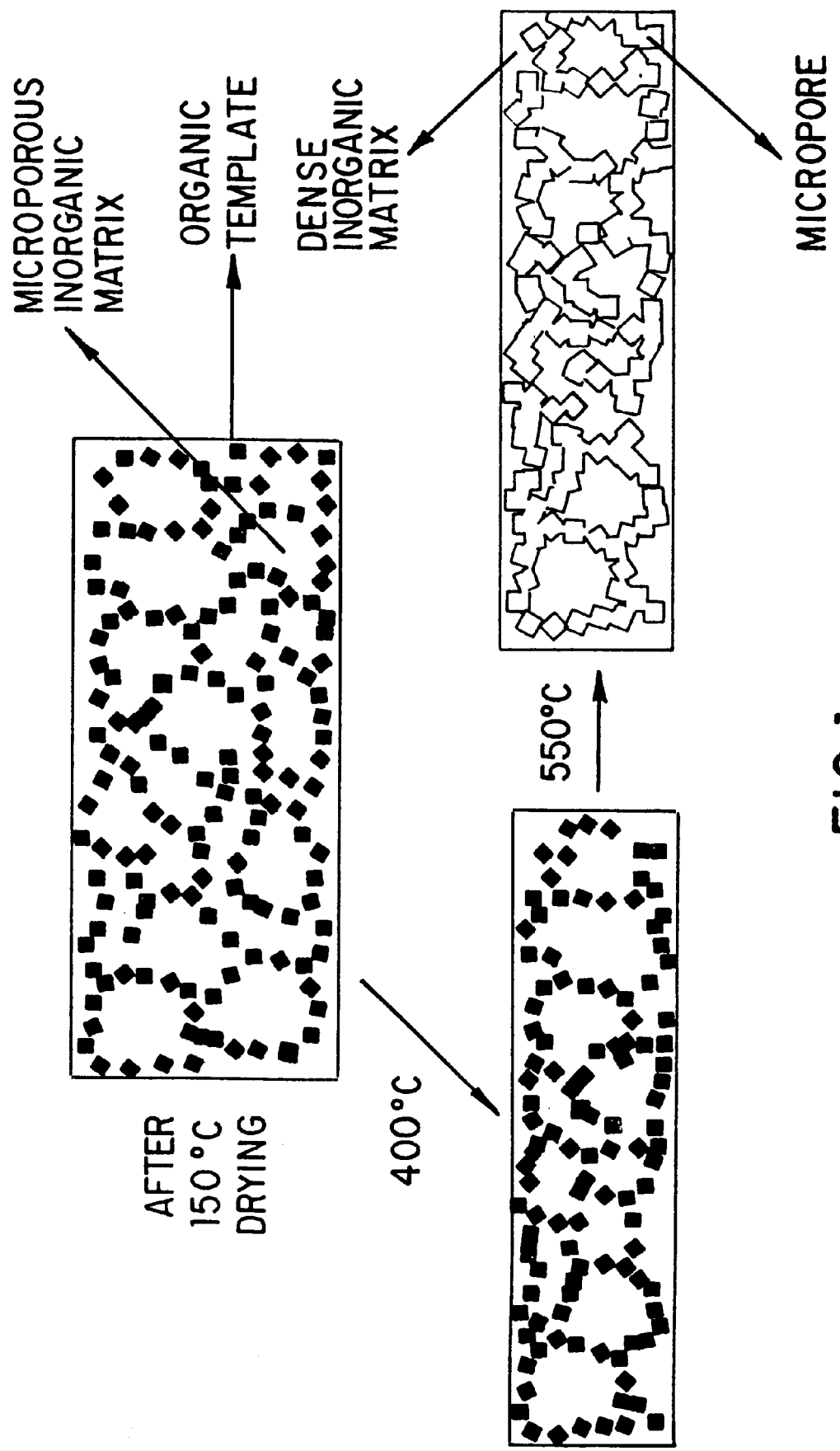
FIG. 1 is a diagram of the organic template approach of this invention showing the progressive densification of the inorganic matrix and creation of micropores by template removal during calcination.

The organic template approach to producing molecular sieving silica membranes in accordance with the process of this invention comprises sol or gel preparation, sol aging, sol dilution and membrane deposition. The first step of the process of this invention is sol or gel preparation. Suitable sols for use in accordance with the process of this invention include polymeric sols (see Brinker and Scherer, *Sol-Gel Science,* Academic Press, San Diego, 1990, pages 6 and 7). Sol compositions include partially or fully hydrolyzed metal alkoxides ($M(OR)_n$), where M is a metal, R is an organic ligand, preferably an alkyl group, and n is an integer having a value equal to a coordination number of said metal. Also suitable are partially or fully hydrolyzed organically substituted metal alkoxides ($R'_x M(OR)_{n-x}$), where R is an organic ligand, R' is a non-hydrolyzable organic ligand that includes alkyl, aryl, or other polymerizable organic ligands, M is a metal, and n and x are integers, where n has a value equal to a coordination number of said metal and x is less than n, and partially or fully hydrolyzed organically modified bridged metal alkoxides ($M(OR)_{n-1}$—R"—$M(OR)_{n-1}$), where R is an organic ligand, R" is a non-hydrolyzable rigid or flexible organic ligand that includes alkyl, alkylene, aryl, or other polymerizable organic ligands, M is a metal, and n is an integer having a value equal to a coordination number of said metal.

Suitable fluid components of the sols in accordance with the process of this invention include alcohol or other organic fluids such as hexane, cyclohexane, toluene, tetrahydrofuran, acetonitrile, methoxyethanol, or multicomponent, preferably miscible, fluid mixtures. The only practical requirements of sols suitable for use in the process of this invention are that they remain stable, that is they do not phase separate or precipitate, during the coating operation, and that the viscosity and concentration are appropriate for the pertinent coating operation.

Sol aging refers to storage of the sol normally in a quiescent state under conditions appropriate to further the extents of hydrolysis, condensation, and/or ripening (see Brinker and Scherer, *Sol-Gel Science,* ibid, Chapter 6). In accordance with the process of this invention, aging is used prior to gelation to grow polymeric species such that polymers are captured on top of the support with minimum pore penetration. Sol aging is also used in organically modified metal alkoxide and composite systems to uniformly incorporate organic ligands without aggregation of the organic and inorganic phases. For the sol clusters characterized by a mass fractal dimension, sol aging can be optimized to make the polymer species mutually transparent, so that they will interpenetrate during deposition and drying. Thus, aging can be used to promote collapse of the network during deposition and drying, thereby creating very small pores and very narrow pore size distributions in gels and membranes. In accordance with one preferred embodiment of the process of this invention, aging is carried out at temperatures in the range of about 25–90° C. and at proton concentrations of about $10^{-1}$ to about $10^{-5}$M.

Film/membrane deposition in accordance with the process of this invention may be carried out by any suitable operation known to those skilled in the art, such as dip-coating or drainage, spin-coating, or other liquid-to-solid coating operations. The coating may be applied to any suitable support including, but not limited to, dense silicon wafers, glass slides, porous supports with a wide range of pore sizes and porosities, microporous glass fibers, and porous ceramic modules. During the coating operation, the polymer clusters are concentrated by evaporation of the fluid component of the sol, leading to the creation of a physical or chemical gel. The gel network is subjected to a capillary pressure described by the Kelvin equation, the magnitude of which depends primarily on the composition of the pore fluid, pore size, and the relative pressure of the pore fluid constituents in the overlying gas. In accordance with a particularly preferred embodiment of the process of this invention, shrinkage of the gel network in response to capillary stresses is maximized without 4separation of the inorganic and organic phases such that any pores created in the matrix are of molecular dimensions.

In accordance with one preferred embodiment of the process of this invention, the as-deposited films are subjected to thermal treatment to complete the drying process, partially consolidate the film through continued condensation reactions, partially or fully consolidate the film through sintering, and pyrolyze the residual organic ligands. Pyrolysis of the organic ligands increases the film/membrane porosity. Under these conditions, the size and shape of the organic ligand can be used to create pores with precisely controlled size, shape and three-dimensional topologies. The volume fraction of the organic ligands may be used to control the volume fraction of the porosity of the film.

In accordance with another preferred embodiment of the process of this invention, chemical treatments, such as ozonolysis, oxygen plasma, photolysis, and selective dissolution can be used to remove residual organic constituents in order to confer additional porosity to the film. It will be apparent to those skilled in the art that more than one organic ligand may be utilized in the synthesis to arrive at a composite structure in which some organic ligands are removed to create porosity while others are retained to provide hydrophobicity.

In accordance with yet another preferred embodiment of the process of this invention, the deposited films are subjected to surface derivatization. Surface derivatization refers to the monolayer-by-monolayer reduction of the pore size and/or alteration of the pore surface chemistry by reaction of reactive terminal sites existing on the surface of the pores with molecules, oligomers, or polymers. Derivatization agents suitable for use in accordance with the process of this invention include, but are not limited to, organofunctional silanes, such as chlorosilanes ($R'_x SiCl_{4-x}$) where R' is an alkyl ligand and x is an integer having a value less than 4; alkyl alkoxysilanes ($R'_x Si(OR)_{4-x}$), where R is an alkyl ligand, R' is a non-hydrolyzable ligand such as alkyl, fluoroalkyl, or amine, and x is an integer having a value less than 4; metal alkoxides, $M(OR)_n$, where M is a metal selected from the group consisting of silicon, titanium or zirconium metal, R is an alkyl ligand and n is an integer having a value equal to a coordination number of said metal; and alcohol amines, for example, triethanol amine; carboxylic acids, for example, acetic acid, and β-diketonates, for example, acetylacetonate.

The collapse of the gel network under capillary stresses during drying dictates the final pore size and volume fraction porosity of the as-deposited films and membranes. It is controllable by the extent of condensation of the polymer network, the extent of organic ligand loading, the magnitude of capillary pressure, the reaction conditions that favor uniform incorporation of the ligands without phase separation, and aging time. That is, reaction and film/membrane deposition conditions that increase the extent of capillary-stress induced collapse of the gel network are preferred so that the collapse of the pore structure completely eliminates pores or creates pores of molecular dimensions. The final pore size, volume fraction porosity, and pore size distribution in films and membranes produced in accordance with the process of this invention is established by the original pore structure in the as-deposited films and membranes and any porosity created or lost during subsequent processing steps designed to remove the pore templates and further consolidate the inorganic matrix.

Aging time is used to grow the polymer clusters in the sol while maintaining the mutual transparency of the clusters, such that during film/membrane deposition, the clusters can interpenetrate freely and, at the same time, are captured on top of the support with minimum pore penetration. Under these conditions, control of the sol concentration and coating rate enables the formation of thin layers, less than about 500 nm, that consistently dry without cracking, leading to defect-free layers.

The as-deposited films and membranes with ultramicropores may be further subjected to pyrolysis or oxygen plasma treatment to remove the template ligands. The microstructure created by template removal is controlled by the size and shape of the organic ligands, the residual porosity of the matrix, network relaxation after template removal, aggregation of templates, pyrolysis temperature of the template ligands with respect to alkoxy ligands (that is, template removal before or after alkoxy pyrolysis), and pyrolysis atmosphere. In accordance with a particularly preferred embodiment of the process of this invention, the organic templates are pyrolyzed under conditions that promote network relaxation and partial/complete sintering that removes the residual porosity of the matrix prior to template removal (See FIG. 1). Under these conditions, pores are created only by the removal of the organic template ligands. The reaction conditions that favor uniform dispersion of the organic templates in the inorganic matrix without aggregation or phase separation are preferred in order to insure that the pores created preserve the original size and shape of the template.

The pore structure of the final film or membrane may be further modified by surface derivatization and subsequent heat treatment. Surface derivatization can be performed using dilute solutions of monomers in a variety of solvents, for example $Si(OR)_4$ or $R'Si(OR)_3$, where R and R' equal $CH_3$, $C_2H_5$, and/or $C_6H_5$, to reduce the pore size, narrow the pore size distribution, heal defects, and/or alter the surface chemistry of the films and the membranes to impart specific adsorption/diffusion characteristics. In accordance with one embodiment of this invention, further heating may be employed to partially sinter the films or membranes to further reduce the pore size and/or narrow the pore size distribution.

EXAMPLE 1

Figure 2:
FIG. 2 is a cross-sectional TEM image of a 550° C. calcined 10 mol % MTES/TEOS membrane layer deposited on a U.S. Filter $\gamma$-$Al_2O_3$ membrane support where region A indicates the $\gamma$-$Al_2O_3$ support and region B is the external microporous $SiO_2$ layer.
Figure 3:
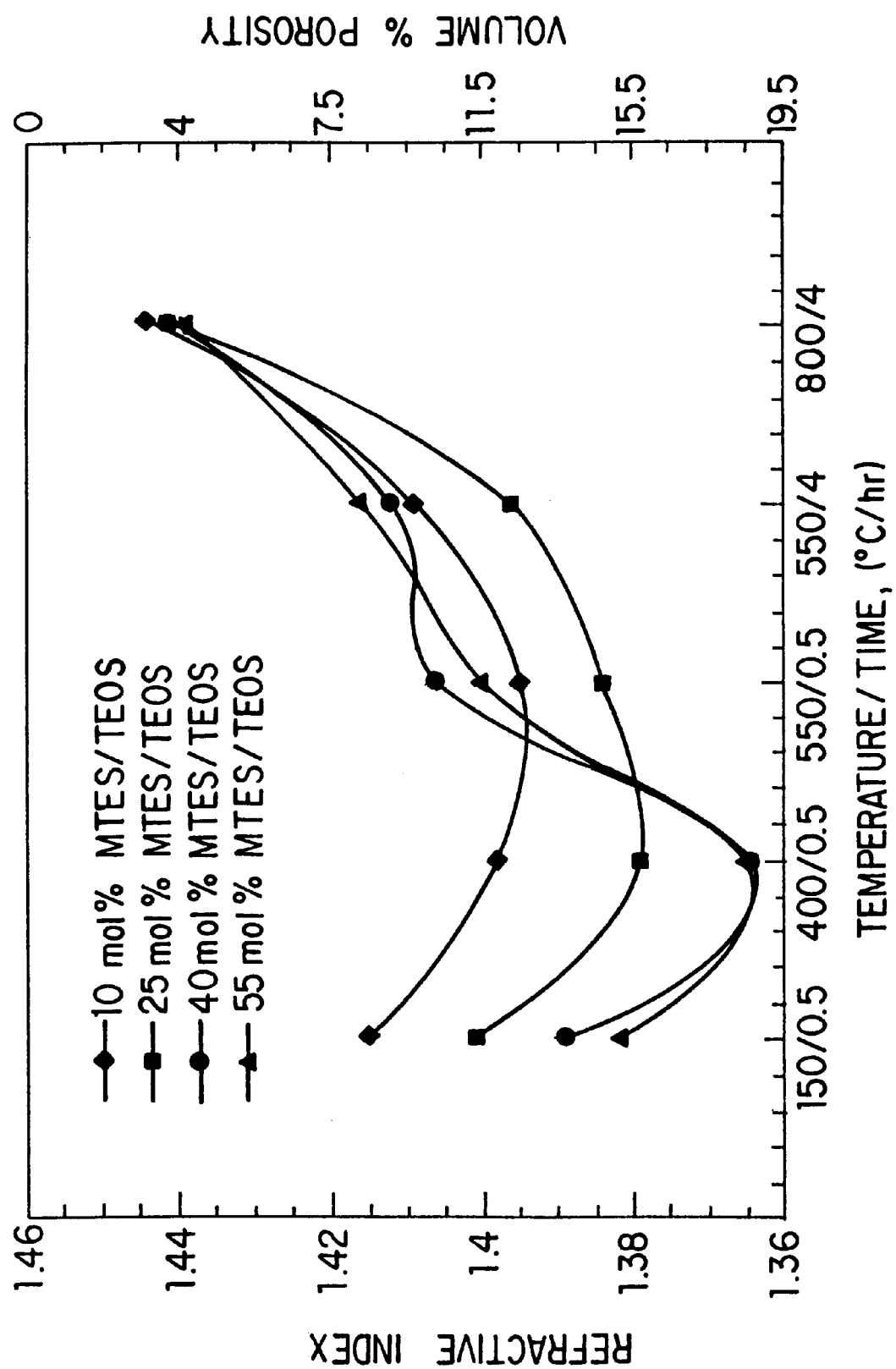
FIG. 3 is a graphical representation of the refractive index and volume percent porosity of MTES/TEOS films as a function of calcination temperature.

This example describes an optimized process for preparing molecular sieving silica membranes in accordance with one embodiment of this invention in which fugitive organic ligands serving as micropore templates are pyrolyzed to create very small pores. Silicate sols were prepared by co-polymerization of tetraethoxysilane (TEOS) and methyltriethoxysilane (MTES) dissolved in ethanol using a two-step acid catalyzed procedure. In the first step, MTES, TEOS, EtOH, $H_2O$, and 1M HCl with molar ratios x:1-x:3.8:1.1:7.0×10$^{-4}$, where x ranged from 10 to 55 mol %, were refluxed at 60° C. for 90 minutes with stirring at 200 rpm. In the second step, additional water and 1M HCl were added at room temperature, resulting in the final molar ratio of x:1-x:3.8:5.1:0.056. Typically, 30 ml of this sol was filtered using 0.2 microns PTFE syringe filters in a 125 ml Nalgene container and allowed to age at 50° C. The gelation time of the sols depended on the MTES content, varying from approximately 50 hours for 10 mol % MTES/90 mol % TEOS sol to approximately 75 hours for a 55 mol % MTES/45 mol % TEOS sol. The sols were typically aged for a $t/t_{gel}$=0.25–0.50 and diluted 1:2 with ethanol that was filtered, also using a 0.2 micron filter (volume sol:volume EtOH) to obtain a sol suitable for coating. The volume of ethanol and the coating speed dictated the final thickness of the films coated on silicon wafers, whereas the size of the polymer clusters in the sol, along with the above mentioned factors, dictated the final thickness of external membrane layers coated on porous supports. Porous supports were cleaned using a $CO_2$ SNOGUN™ cleaner and preheated to the subsequent heat treatment temperature of the membrane, and outgassed at 150° C. for 6 hours on under flowing UHP $N_2$ prior to membrane deposition. Following the above procedure, we were able to prepare films on silicon wafers in the thickness range of 160–260 nm, and membranes on porous tubular supports in the thickness range of 40–125 nm on top of the support with some sol penetration into the pores of the support as shown in FIG. 2. In addition, the cross-sectional TEM micrograph in FIG. 2 shows the 10 mol % MTES/TEOS membrane layer deposited on the γ-$Al_2O_3$ tubular support to be featureless and crack free under the deposition conditions. The as-deposited films exhibited a porosity in the 10–15% range depending on the MTES content as shown in FIG. 3 and the membranes showed molecular sieving behavior (see columns 4, 5, 6 and 7 in Table 1 hereinbelow).

calcination temperature. After pyrolysis at 550° C. for 4 hours to remove the methyl ligands, and outgassing at 400° C. for 6 hours under UHP $N_2$, the permeance of larger gas molecules such as $N_2$, $CH_4$, and $SF_6$, decrease dramatically compared to He and $CO_2$. The separation factor for the gas pairs, $CO_2/CH_4$, $He/N_2$, $He/SF_6$ (12.2, 15.4, 24.3,

TABLE 1

| Membrane | Time (hr) @ Temperature (° C.) | He Permeance | $\alpha He/SF_6$ | $\alpha He/N_2$ | $CO_2$ Permeance | $\alpha CO_2/CH_4$ |
|---|---|---|---|---|---|---|
| 10% MTES/TEOS | 0.5 @ 150 | $2.55 \times 10^{-3}$ | 12.1 | 8.7 | $2.29 \times 10^{-3}$ | 1.5 |
| t/tgel = 0.24 | 0.5 @ 400 | $2.24 \times 10^{-2}$ | 7.2 | 1.3 | $1.81 \times 10^{-2}$ | 1.2 |
|  | 4.0 @ 550 | $2.31 \times 10^{-3}$ | 24.3 | 15.4 | $2.57 \times 10^{-3}$ | 12.2 |
| Surface Derivatization with 1:12 TEOS monomer | 4.0 @ 400 | $1.32 \times 10^{-4}$ | 328 | 14.4 | $2.04 \times 10^{-4}$ | 71.5 |
| 40% MTES/TEOS | 0.5 @ 150 | $1.34 \times 10^{-3}$ | 12.0 | 2.2 | $1.72 \times 10^{-3}$ | 1.8 |
| t/tgel = 0.24 | 0.5 @ 400 | $2.71 \times 10^{-3}$ | 15.2 | 2.2 | $3.29 \times 10^{-3}$ | 2.0 |
|  | 4.0 @ 550 | $4.64 \times 10^{-3}$ | 14.3 | 2.4 | $6.79 \times 10^{-3}$ | 3.2 |
| Surface Derivatization with 1:12 TEOS monomer | 4.0 @ 400 | $2.0 \times 10^{-4}$ | 47.6 | 7.7 | $5.0 \times 10^{-4}$ | 36.5 |

EXAMPLE 2

Figure 5:
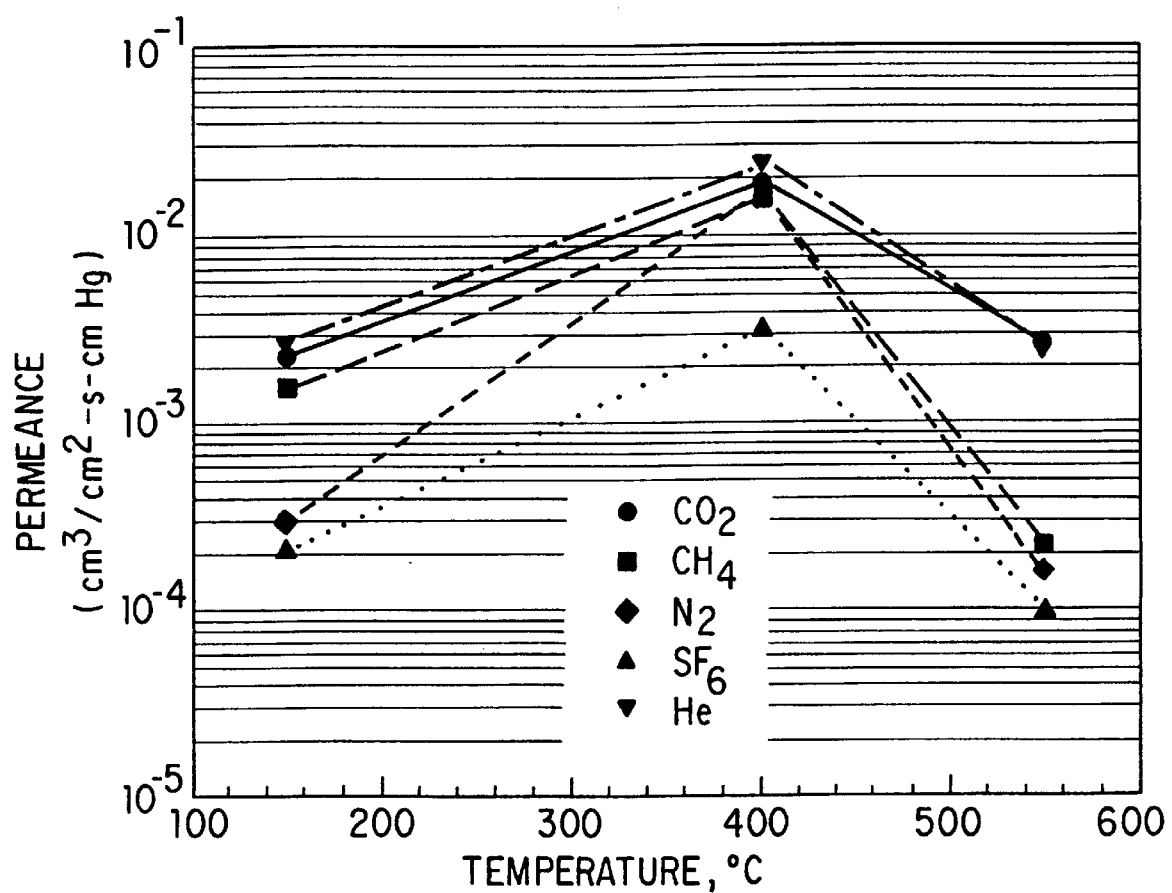
FIG. 5 is a graphical representation showing single gas permeance data of 10 mol % MTES/TEOS membranes as a function of calcination temperature.

This example describes the enhancement of film porosity and membrane flux by a simple low-temperature heat treatment procedure using membranes prepared in accordance with Example 1. The films and membranes prepared from Example 1, having a volume percent porosity of about 14%, were placed in a quartz tube with flowing air and heated in a box furnace with a heating and cooling rate of 1° C. per hour. The films dip-coated on silicon wafers and membranes dip-coated on porous supports were pyrolyzed at 400° C. for 0.5 hours. The membranes were further outgassed at 150° C. for six hours in flowing ultrahigh purity (UHP) nitrogen. The porosity of the films after 400° C. heat treatment increased to about 15 to 20 volume percent depending on the MTES content, and the flux through the membranes increased by a factor of 5 to 10 depending on the size of the gases studied. FIG. 5 illustrates single gas permeance data for 10 mol % MTES/TEOS membranes.

Figure 4A:
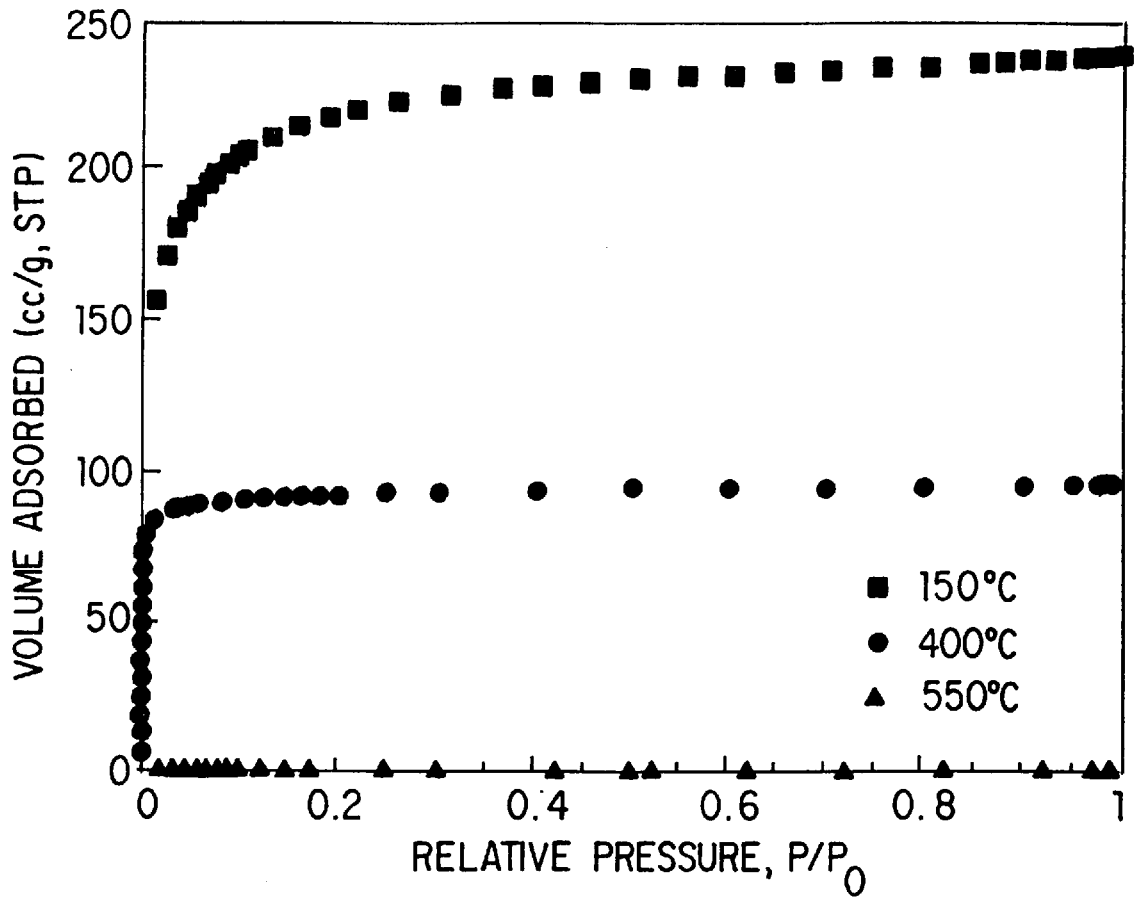
FIGS. 4A and 4B are a graphical representations of $N_2$ sorption isotherms of a 10 mol % MTES/TEOS xerogel as a function of calcination temperature.
Figure 4B:
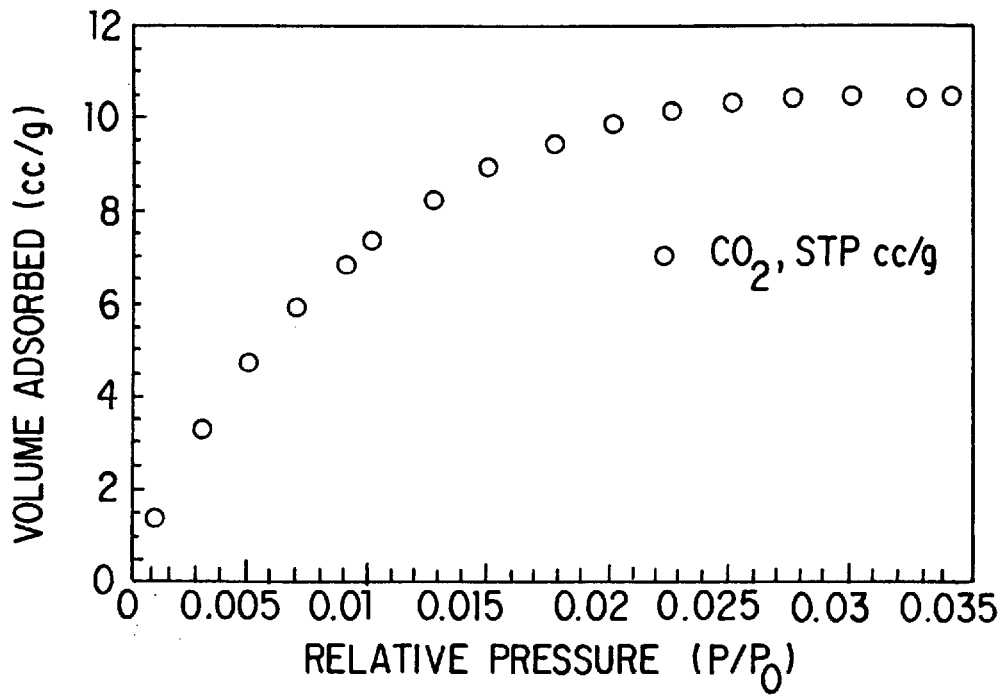

The consequence of removing the organic templates from xerogel (dried gel) bulk samples prepared under identical conditions is illustrated in FIGS. 4A and 4B which show the $N_2$ sorption isotherm of the 10 mol % MTES/TEOS xerogels as a function of calcination temperature along with a partial $CO_2$ isotherm of the 550° C. sample. The $N_2$ sorption isotherms appear to change from Type I, characteristic of microporous materials at 150° C. and 450° C., respectively, to Type II, characteristic of non-porous materials after calcination at 550° C. However, the partial $CO_2$ isotherm shows the 550° C. sample also to be microporous (see inset in FIG. 4). The apparent discrepancy between the $N_2$ and $CO_2$ data arises because the pores in the xerogel are so small that the diffusion of $N_2$ at 77K is severely kinetically limited compared to $CO_2$ at 273K. By 550° C., the scale of porosity is apparently quite small and the densification of the inorganic matrix is virtually complete, based on essentially zero uptake of $N_2$ at 77K versus $CO_2$ at 273K.

The consequence of removing the organic templates from membranes prepared in accordance Examples 1 and 2 is shown in FIG. 5 which shows the single gas permeance data of 10 mol % MTES/TEOS membranes as a function of respectively) are well above the ideal Knudsen values and increase as the difference in their kinetic diameters increases, implying that a molecular sieving mechanism governs transport (see FIG. 5 and columns 4, 5, and 7 of Table 1). The $CO_2$ and He permeance of the membranes after the 550° C. heat treatment were in general higher than those measured after drying at 150° C., indicating a net creation of porosity by this approach.

EXAMPLE 3

Figure 6:
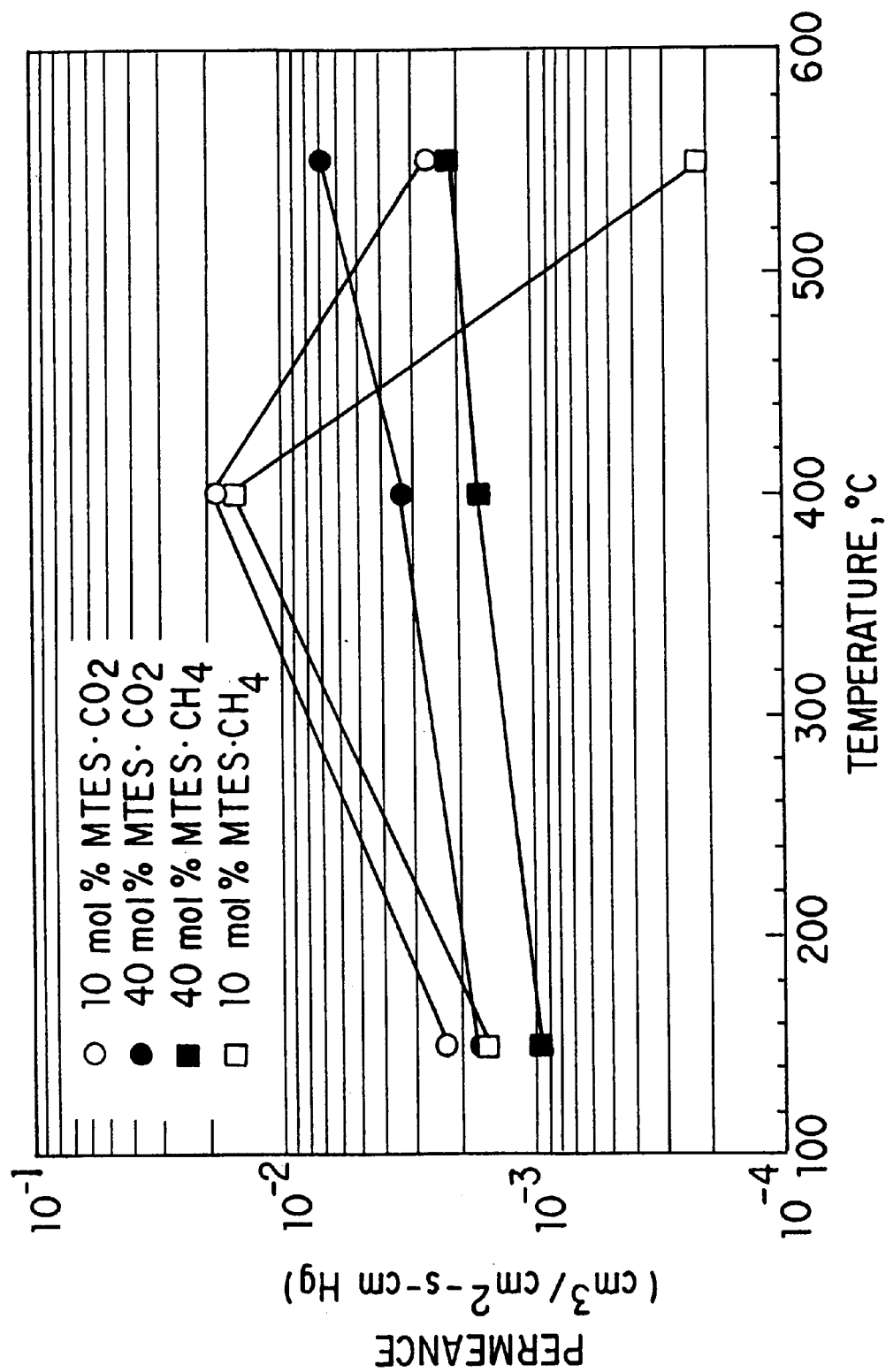
FIG. 6 is a graphical representation showing a comparison $CO_2$ and $CH_4$ permeances of 10 mol % and 40 mol % MTES/TEOS membranes as a function of calcination temperature.

This example describes the control of the porosity of films and the permeance of membranes by varying the mol % loading of the organic ligands. The carbon dioxide and methane permeances of membranes prepared from 10 mol % MTES and 40 mol % MTES are shown in FIG. 6. After a 550° C. heat treatment to pyrolyze the ethoxy and methyl ligands, the 40 mol % MTES membranes exhibited carbon dioxide and methane permeances that were about 2 to 10 times greater than the corresponding fluxes of 10 mol % MTES membranes. This shows that permeance is at least partially controlled by the volume fraction of the template addition. Similarly, the porosity of the 40 mol % MTES films after 400° C. pyrolysis were approximately twice that of 10 mol % MTES films.

EXAMPLE 4

Figure 7:
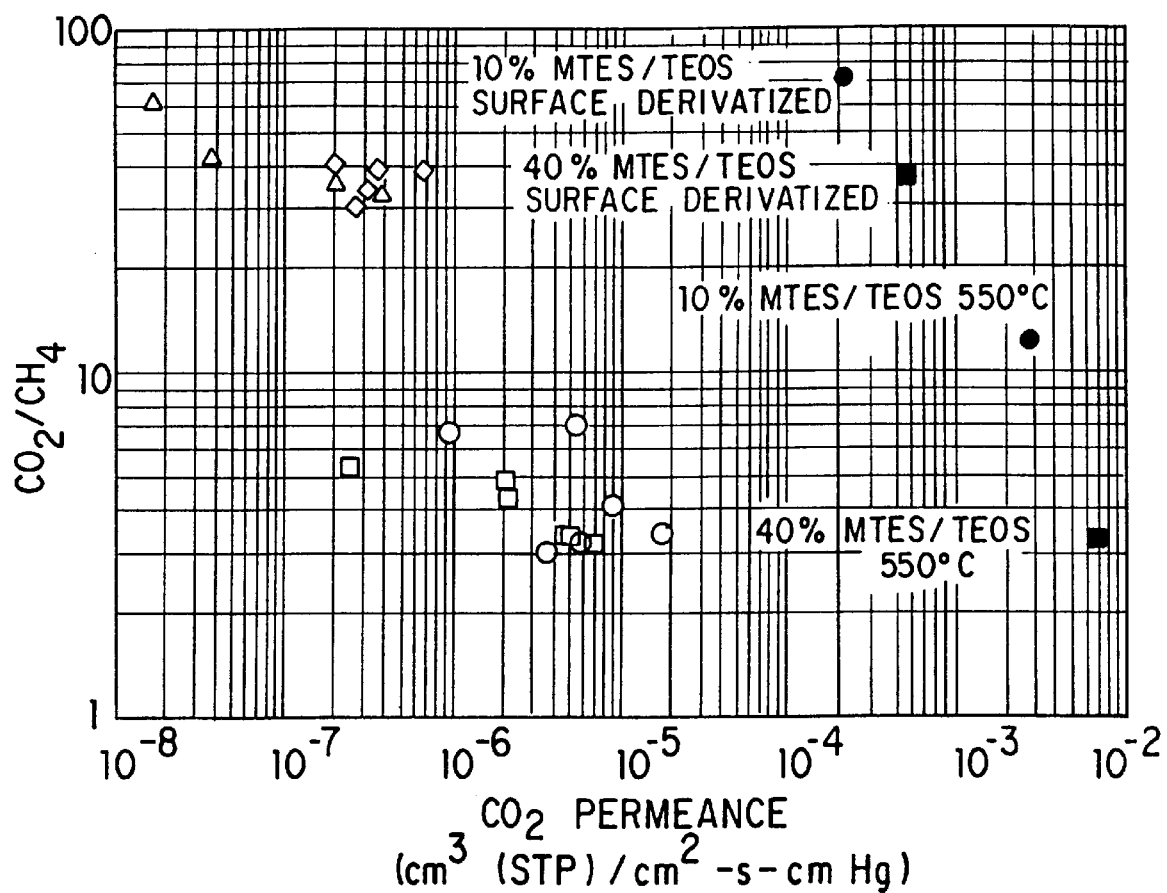
FIG. 7 is a graphical representation showing a comparison of $CO_2$ permeance and $CO_2/CH_4$ separation factor of known organic membranes and those of microporous inorganic membranes prepared in accordance with the process of this invention.

This example describes the surface derivatization of the pore surfaces of the membranes prepared in accordance with Examples 2 and 3, using a very dilute solution of TEOS. The membranes described above were dip-coated in a sol containing monomeric TEOS that was diluted 1:12 with ethanol (volume TEOS:volume ethanol) and calcined at 400° C. for 4 hours and outgassed at 400° C. for 6 hours under flowing UHP $N_2$. After two surface derivatization treatments, the $He/SF_6$, $He/N_2$, and $CO_2/CH_4$ separation factors were 328, 14.4, 71.5, respectively, for the 10 mol % MTES/TEOS membranes. The corresponding separation factors for the 40 mol % MTES/TEOS membranes were 47.6, 7.7, and 36.5, respectively. This large increase in separation factor with only a modest reduction in $CO_2$ and He permeance is attributed to monolayer-by-monolayer reduction in the pore size of the membranes. The efficacy of the surface derivatization approach in accordance with one embodiment of this invention is apparent when we compare the results for MTES/TEOS membranes with known organic polymer membranes as shown, for example, in FIG. 7. Compared to organic polymer membranes exhibiting separation factors in the range of 70–80, the microporous inorganic membranes exhibit more than 1000 times greater permeance.

The kinetics of stress development and relaxation of thin films exposed to a series of alcohol molecules with increasing molecular diameters was used as a molecular probe technique to determine the influence of template ligand size and shape on the resulting pore size. For TEOS, 25 mol % MTES/TEOS and 25 mol % PTMS (phenyltrimethoxysilane/TEOS) films prepared under identical conditions and pyrolyzed at 550° C. under an oxidizing atmosphere, the radius of the largest alcohol molecule that fit into the pores increased from 0.38 nanometers (isopropanol) to 0.41 nanometers (t-butanol) to 0.45 nanometers (3, 5, dimethyl benzylalcohol), respectively. These data show that pore radius increases with template size for methyl and phenyl templated silicas, but the average pore radius somewhat exceeds the templates sizes (estimated as approximately 0.19 nanometers for methyl and approximately 0.34 nanometers for phenyl).

With regard to the correspondence between volume fraction template and volume fraction porosity, it is generally observed that the pore volume fraction is less than that of the templates for molar percentages of organotrialkoxysilanes exceeding about 10%. This stems from relaxation of the network that accompanies template pyrolysis and any enhanced sintering. This effect is more pronounced in systems containing large template concentrations and, especially, for low pyrolysis temperatures due to the lower extents of condensation of the matrix at the moment the templates are pyrolyzed for these situations. These effects can be minimized by increasing the extent of condensation of the matrix prior to template pyrolysis.

For practical applications, molecular sieving membranes must exhibit long term thermal and chemical stability. Thermal stability refers to the stability towards densification of the silica matrix at high temperatures by mechanisms such as structural relaxation and viscous sintering. Due to their small pore sizes, bulk microporous xerogels densify by 550° C., resulting in significant loss of surface area and porosity. However, as previously stated, the constraint imposed by the support prevents significant densification of thin films and membranes in the 200 to 600° C. temperature range.

Another consequence of reducing the pore size in amorphous silica membranes is that microporous silica is known to undergo aging in water or steam environments, often resulting in a loss of surface area and pore volume. For membranes, this can result in a reduction in flux and possibly separation factor. Due to the extremely small pore sizes, the driving force for water adsorption is quite high. Even very low water levels can cause long term stability problems, resulting in deterioration of the membrane performance.

Figure 8:
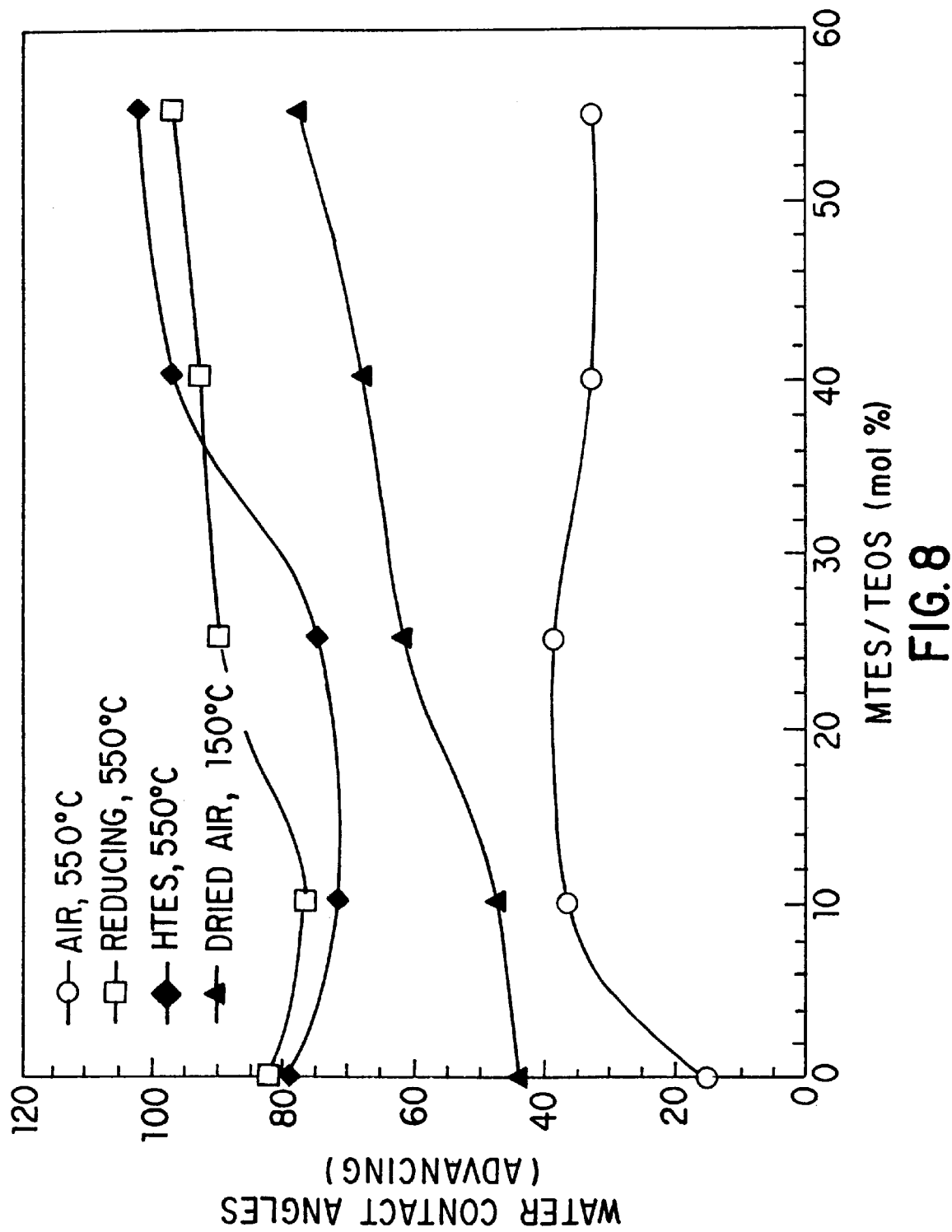
FIG. 8 shows the relative hydrophobicity of films prepared in accordance with the process of this invention after (a) drying at 150° C., (b) calcining in an oxidizing atmosphere at 550° C., and (c) calcining in a reducing atmosphere at 550° C.

One approach for dealing with the problem of water condensation in the pores of molecular sieving membranes is to make the pore surface hydrophobic. This is achieved with membranes produced in accordance with one embodiment of the process of this invention by heating the membranes under reducing conditions. FIG. 8 compares the advancing water contact angles, θ, for these films after (a) drying at 150° C., (b) calcining in an oxidizing atmosphere (air) at 550° C. and, (c) calcining in a reducing atmosphere at 550° C. In accordance with a particularly preferred embodiment of the process of this invention, said reducing atmosphere comprises a gas selected from the group consisting of argon, nitrogen, 4% hydrogen/96% nitrogen, and mixtures thereof. The water contact angles, that is the hydrophobicity, of the as-dried films increased from 45 to 80° with increases in the MTES/TEOS mol ratio from 0 to 55%. Calcination in air to pyrolyze the methyl ligands decreased the water contact angles, that is decreased the film hydrophobicity, to about 35°, regardless of the MTES concentration. However, calcination under reducing atmospheric conditions increased the water contact angle θ to greater than 100°. The latter values increased with increasing methyl ligand content and remained the same even after storing the films at 150° C. and approximately 50% relative humidity for three months. For example, increasing the MTES/TEOS mol ratios from 0 to 55 mol % increased the water contact angle θ from 80° to 104°. These results clearly establish that the long term hydrolytic stability of molecular sieving membranes produced in accordance with the process of this invention can be enhanced by calcination in a reducing atmosphere.

Figure 9:
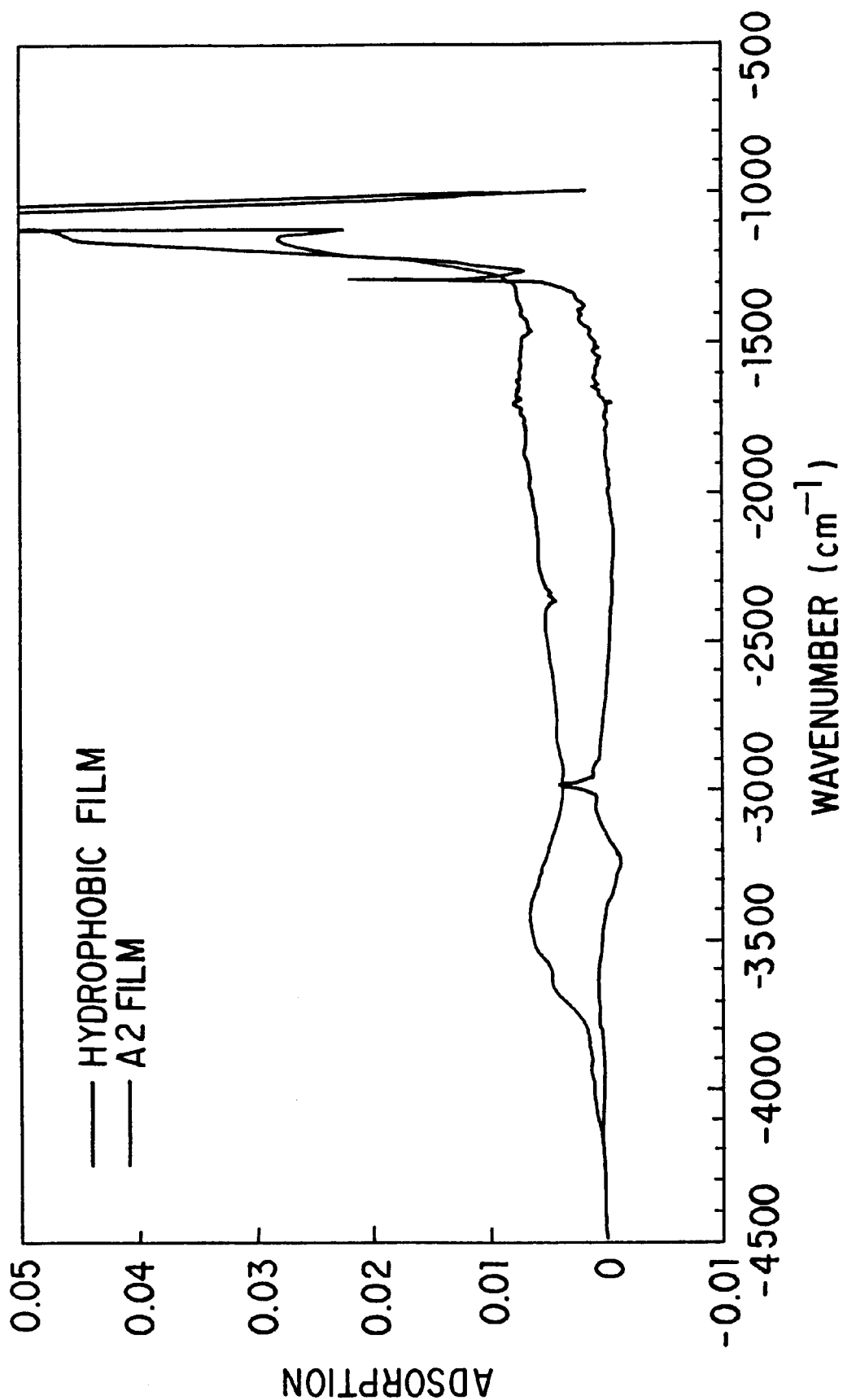
FIG. 9 shows the FTIR spectra of (a) A2 films calcined in air at 400° C. and (b) 55 mol % MTES/TEOS films calcined in argon at 550° C.

FIG. 9 shows the FTIR spectra of (a) A2 films calcined in air at 400° C. and (b) 55 mol % MTES/TEOS films calcined in argon at 550° C. The spectra are truncated to clarify the water absorption in the two films. The common features in both the spectra are the presence of Si—O—Si peak (1090 cm$^{-1}$) and the Si—O—Si shoulder (1221 cm$^{-1}$). The 1221 cm$^{-1}$ peak is more pronounced in the hydrophobic films due to the overlap of Si—O—Si stretch with the Si—O—Si stretch of silicons attached to carbons (1250–1260 cm$^{-1}$). The significant differences between the two spectra are the presence of symmetric —CH$_3$ stretch (2960 cm$^{-1}$), C—H (1340 cm$^{-1}$), and the lack of any absorption in the SiO—H region (3200–3700 cm$^{-1}$) for the hydrophobic film. The results show that the films calcined under reducing conditions have a hydrophobic surface terminated by SiC bonds and are consistent with the water contact angle θ of 104° measured for these films.

Figure 10:
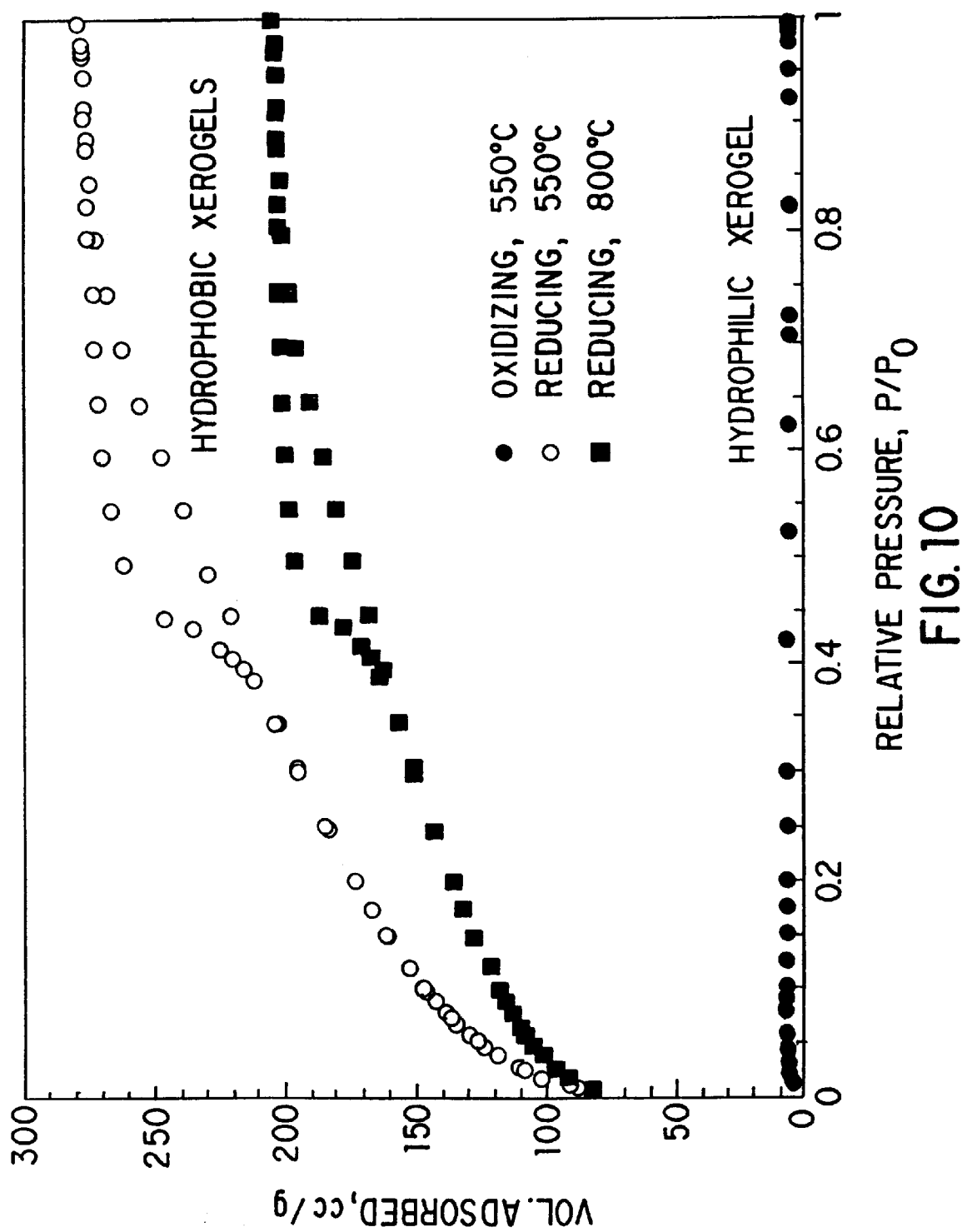
FIG. 10 shows a comparison of $N_2$ at 77K sorption isotherms of 55 mol % MTES/TEOS xerogel pyrolyzed under (a) oxidizing atmosphere at 550° C./0.5 hours, (b) reducing atmosphere at 550° C./0.5 hours, and (c) reducing atmosphere at 800° C./0.5 hours.

FIG. 10 shows a comparison of nitrogen at 77K sorption isotherms of 55 mol % MTES/TEOS xerogel pyrolyzed under (a) an oxidizing atmosphere at 550° C./0.5 hours, (b) a reducing atmosphere at 550° C./0.5 hours, and (c) a reducing atmosphere at 800° C./0.5 hours. The xerogels calcined under oxidizing conditions are hydrophilic with a water contact angle of approximately 30 to 40° based upon measurements of corresponding films. By comparison, the xerogels calcined under reducing conditions are hydrophobic with a water contact angle θ of about 102 to 106° based upon measurement of corresponding films.

As shown in FIG. 10, the hydrophilic xerogels are almost non-porous to nitrogen (Type II isotherm) after calcination at 550° C., whereas the hydrophobic xerogels exhibit a Type IV isotherm characteristic of mesoporous materials. In addition, the microstructure of the hydrophobic xerogels remains nearly the same on heating to 800° C. in a reducing atmosphere. This is due to the incorporation of carbon in the network as silicon carbide or silicon oxycarbide that impart refractory-like character to the network. The high viscosity of the network due to incorporation of carbon combined with low surface free energies (less than about 30 dyne/cm, measured from contact angle experiments) shifts the onset of viscous sintering to higher temperatures. The larger pore size of the hydrophobic xerogels is due to redistribution reactions that remove highly volatile small cyclic and/or oligomeric species around 450–550° C. However, as shown above, much smaller pore sizes can be achieved in thin films through proper choice of sol composition, aging time, and deposition conditions.

These high surface area (600 m$^2$/g) hydrophobic xerogels, thin films, and membranes have applications in catalysis (as catalyst supports), water repellant coatings, thermally and hydrolytically stable molecular sieving membranes, and sensors.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for producing a molecular sieve silica membrane comprising:

depositing a hybrid organic-inorganic polymer comprising at least one organic constituent and at least one inorganic constituent on a porous substrate material, said hybrid organic-inorganic polymer comprising at least one compound selected from the group consisting of partially hydrolyzed alkoxides, fully hydrolyzed alkoxides, partially organically substituted metal alkoxides, partially hydrolyzed organically modified metal alkoxides, fully hydrolyzed organically modified metal alkoxides, partially hydrolyzed organically modified bridged metal alkoxides, fully hydrolyzed organically modified bridged metal alkoxides, and mixtures thereof; and removing at least a portion of said at least one organic constituent of said hybrid organic-inorganic polymer, forming a porous film.

2. A process in accordance with claim 1, wherein said hybrid organic-inorganic polymer comprises at least one of said partially hydrolyzed alkoxides and said fully hydrolyzed alkoxides having the formula $$M(OR)_n$$

where M is a metal, R is an organic ligand and n is an integer having a value equal to a coordination number of said metal.

3. A process in accordance with claim 2, wherein said organic ligand is an alkyl group.

4. A process in accordance with claim 2, wherein said metal is selected from the group consisting of silicon, titanium and zirconium.

5. A process in accordance with claim 1, wherein said hybrid organic-inorganic polymer comprises said partially organically substituted metal alkoxides having the formula $$R'_x M(OR)_{n-x}$$

where R is an organic ligand, R' is a non-hydrolyzable organic ligand, M is a metal, n and x are integers, n having a value equal to a coordination value of said metal, and x<n.

6. A process in accordance with claim 5, wherein said non-hydrolyzable organic ligand is a polymerizable organic ligand selected from the group consisting of allyl ligands, acryl ligands, vinyl ligands, epoxy ligands and mixtures thereof.

7. A process in accordance with claim 5, wherein said metal is selected from the group consisting of silicon, titanium and zirconium.

8. A process in accordance with claim 1, wherein said hybrid organic-inorganic polymer comprises at least one of said partially hydrolyzed organically modified bridged metal alkoxides and said fully hydrolyzed organically modified bridged metal alkoxides having the formula $$M(OR)_{n-1}-R''-M(OR)_{n-1}$$

where R is an organic ligand, R'' is a non-hydrolyzable rigid or flexible organic ligand, M is a metal, and n is an integer having a value equal to a coordination number of said metal.

9. A process in accordance with claim 8, wherein said non-hydrolyzable organic ligand is a polymerizable organic ligand selected from the group consisting of allyl ligands, acryl ligands, vinyl ligands, epoxy ligands and mixtures thereof.

10. A process in accordance with claim 8, wherein said metal is selected from the group consisting of silicon, titanium and zirconium.

11. A process in accordance with claim 1, wherein said hybrid organic-inorganic polymer is prepared from a sol using a sol-gel process.

12. A process in accordance with claim 11, wherein said sol comprises an organic fluid selected from the group consisting of an alcohol, hexane, cyclohexane, toluene, tetrahydrofuran, acetonitrile, methoxyethanol, and mixtures thereof.

* * * * *